(12) United States Patent
Yang et al.

(10) Patent No.: US 11,940,471 B2
(45) Date of Patent: Mar. 26, 2024

(54) VOLTAGE ATTACK DETECTION CIRCUIT AND CHIP

(71) Applicant: SHENZHEN GOODIX TECHNOLOGY CO., LTD., Guangdong (CN)

(72) Inventors: Jiang Yang, Guangdong (CN); Jianfeng Xue, Guangdong (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 311 days.

(21) Appl. No.: 17/486,292

(22) Filed: Sep. 27, 2021

(65) Prior Publication Data
US 2022/0011351 A1    Jan. 13, 2022

Related U.S. Application Data

(63) Continuation of application No. PCT/CN2020/082830, filed on Apr. 1, 2020.

(51) Int. Cl.
*G01R 19/165*      (2006.01)
*G05F 1/10*      (2006.01)

(52) U.S. Cl.
CPC .......... *G01R 19/16533* (2013.01); *G05F 1/10* (2013.01)

(58) Field of Classification Search
CPC ........ G01R 19/16533; G01R 19/16538; G01R 31/2832; G01R 19/165; G01R 31/2827; G05F 1/10; G06F 21/755
See application file for complete search history.

(56) References Cited

U.S. PATENT DOCUMENTS

| 7,102,395 B2 * | 9/2006 | Saito | ............... G01R 19/16552 327/541 |
| 8,988,114 B2 * | 3/2015 | Wadhwa | .......... G01R 19/16552 330/307 |

(Continued)

FOREIGN PATENT DOCUMENTS

| CN | 101438303 A | 5/2009 |
| CN | 103034804 A | 4/2013 |

(Continued)

OTHER PUBLICATIONS

Goikoetxea Yanci, A. et al., "Detecting Voltage Glitch Attacks on Secure Devices", Bio-inspired, Learning & Intelligent Systems for Security, IEEE Computer Society (2008), pp. 75-80.

(Continued)

*Primary Examiner* — Akm Zakaria
(74) *Attorney, Agent, or Firm* — SCULLY, SCOTT, MURPHY & PRESSER, P.C.

(57) ABSTRACT

A voltage attack detection circuit includes at least one voltage regulation circuit, at least one voltage sensor and at least one glitch sensor. The at least one voltage sensor is configured to receive at least one first voltage output by the at least one voltage regulation circuit respectively, and output at least one first signal respectively. The at least one first signal is configured to indicate whether it is under voltage attack of a duration in a first range and an attack strength in a second range respectively. The at least one glitch sensor is configured to receive at least one first voltage respectively, and configured to output at least one second signal respectively. The at least one second signal is configured to indicate whether it is under voltage attack of a duration in a third range and an attack strength in a fourth range.

20 Claims, 2 Drawing Sheets

(56) References Cited

U.S. PATENT DOCUMENTS

| | | |
|---|---|---|
| 10,156,595 B2 | 12/2018 | Nirwan et al. |
| 11,460,515 B2 * | 10/2022 | Pinon ............... G01R 31/31719 |
| 2010/0299756 A1 | 11/2010 | Ostertun et al. |
| 2015/0346246 A1 * | 12/2015 | Tasher ............. G01R 19/16552 |
| | | 324/762.01 |
| 2018/0164351 A1 | 6/2018 | Nirwan et al. |
| 2019/0278945 A1 | 9/2019 | Sugahara et al. |
| 2021/0240823 A1 * | 8/2021 | Margalit ............... G06F 21/554 |

FOREIGN PATENT DOCUMENTS

| | | |
|---|---|---|
| CN | 105510688 A | 4/2016 |
| CN | 105629028 A | 6/2016 |
| CN | 107462827 A | 12/2017 |
| CN | 107505560 A | 12/2017 |

OTHER PUBLICATIONS

Gomina, K. et al., "Power supply glitch attacks: Design and evaluation of detection circuits", 2014 IEEE International Symposium on Hardware-Oriented Security and Trust (HOST). IEEE (2014), pp. 136-141.

* cited by examiner

VOLTAGE ATTACK DETECTION CIRCUIT AND CHIP

CROSS REFERENCE TO RELATED APPLICATIONS

The present application is a continuation of international application No. PCT/CN2020/082830, filed on Apr. 1, 2020, which is hereby incorporated by reference in its entirety.

TECHNICAL FIELD

Embodiments of the present application relate to the field of electronics, and in particular, to a voltage attack detection circuit and a chip containing or equipped with the voltage attack detection circuit.

BACKGROUND

With the widespread popularity of mobile payments and transactions, electronic devices are increasingly used to store, process, and transmit data containing key information. For example, a security chip can be used to implement functions such as user identification and key data storage, and it is widely applied in the financial field. As a foundation of security hardware, the security chip plays an essential role in information security. In recent years, more and more chip-level attack methods and instances have been disclosed, and accordingly, higher and higher requirements are put forward for chip-level security.

There are many ways of chip-level attacks, among which error injection attack is the most effective. The purpose of the error injection attack is to force the chip to perform an abnormal operation, thereby causing security information in the chip to be exposed. At this point, an attacker can easily obtain confidential data in the security chip by using fault analysis technology. There are many ways of the error injection attacks, such as voltage attack, temperature attack, laser attack, electromagnetic attack and the like.

For voltage attacks, by changing a supply voltage of a power domain of the chip, a circuit inside the chip is made to work abnormally, thereby causing a trigger to enter an error state, causing a processor to skip or perform a wrong operation, so that the security information in the chip is exposed.

In general, inside of the chip is divided into a plurality of different power domains. Although each power domain is independent, there are certain dependencies and interactions between them. Therefore, each power domain must be protected. In other words, the chip needs to build a complete voltage attack protection solution for the whole power domain. In addition, the current voltage attack protection solution is merely for the protection of the voltage to be detected, and its protection form is single and there are certain protection blind spots.

Therefore, it is very important to provide a complete and reliable protection solution against supply attacks.

SUMMARY

A voltage attack detection circuit and a chip are provided, which can not only perform voltage attack protection for the whole power domain, but improve the reliability of the protection solution.

In a first aspect, a voltage attack detection circuit is provided, including:
at least one voltage regulation circuit;
the at least one voltage regulation circuit is connected to an external supply, the at least one voltage regulation circuit is configured to convert the external supply to at least one internal supply respectively, and the at least one internal supply is configured to output at least one first voltage respectively;
at least one voltage sensor and at least one glitch sensor;
where the at least one voltage sensor is configured to receive the at least one first voltage respectively, and configured to output at least one first signal respectively, the at least one first signal is configured to indicate whether the at least one internal supply is under voltage attack of a duration in a first range and an attack strength in a second range respectively, the at least one glitch sensor is configured to receive the at least one first voltage respectively, and configured to output at least one second signal respectively, the at least one second signal is configured to indicate whether the at least one internal supply is under voltage attack of a duration in a third range and an attack strength in a fourth range, a minimum value of the first range is greater than or equal to a maximum value of the third range, and an absolute value of a maximum value of the second range is less than or equal to an absolute value of any value of the fourth range.

Through the at least one voltage sensor, a voltage attack with an attack duration in the first range and an attack strength in the second range can be detected, and through the at least one glitch sensor, a voltage attack with an attack duration in the third range and an attack strength in the fourth range can be detected, which can perform voltage attack protection in all aspects in terms of the attack duration and the attack strength, so as to improve the reliability of the voltage attack protection solution.

In other words, by clarifying the characteristics of voltage attacks (that is, the attack duration and the attack strength) to distinguish the types of voltage attacks, and then adopt different protective measures (that is, the voltage sensor and the glitch sensor) for voltage attack protection for different types of voltage attacks, so as to cover attack measures in all aspects with respect to each power domain (that is, each voltage regulation circuit), so as to construct a comprehensive and reliable anti-attack solution for the entire power domain (that is, the at least one voltage regulation circuit).

In some possible implementation manners, the minimum value of the first range is 0.1 us.

In some possible implementation manners, the third range is 1 ns to 0.1 us.

In some possible implementation manners, the absolute value of the maximum value of the second range and/or an absolute value of a minimum value of the fourth range is proportional to an absolute value of a voltage of the external supply.

In some possible implementation manners, the second range is $-0.5*V \sim 0.5*V$, where V represents a voltage value of the external supply.

In some possible implementation manners, the fourth range is $0.5*V \sim V$, and/or the fourth range is $-V \sim -0.5*V$.

In some possible implementation manners, the at least one voltage sensor is connected to the at least one internal supply respectively, to receive the at least one first voltage respectively, and the at least one voltage sensor is configured to output the at least one first signal based on a received reference voltage and the at least one first voltage.

In some possible implementation manners, the voltage attack detection circuit further includes:
an external supply voltage sensor and an external supply glitch sensor;

where the external supply is configured to output a second voltage, the external supply voltage sensor is connected to the external supply, the external supply voltage sensor is configured to receive the second voltage and output a third signal, the third signal is configured to indicate whether the second voltage is under voltage attack of a duration in the first range and an attack strength in the second range; the external supply glitch sensor is connected to the external supply, the external supply glitch sensor is configured to receive the second voltage and output a fourth signal, and the fourth signal is configured to indicate whether the second voltage is under voltage attack of a duration in the third range and an attack strength in the fourth range.

In some possible implementation manners, each voltage regulation circuit of the at least one voltage regulation circuit includes at least one of following elements: a low dropout regulation circuit, a charge pump, a BUCK converter, a Boost converter and a Direct current-Direct current converter.

In some possible implementation manners, each voltage sensor of the at least one voltage sensor includes a hysteresis comparator.

In a second aspect, a chip is provided, including:

a power management unit; and the voltage attack detection circuit according to the first aspect or any possible implementation manners of the first aspect, where the power management unit is connected to the voltage attack detection circuit, and the voltage attack detection circuit is configured to detect whether a supply voltage of the power management unit is under voltage attack.

DESCRIPTION OF EMBODIMENTS

The following describes the technical solutions in the embodiments of the present application with reference to the accompanying drawings.

Figure 1:
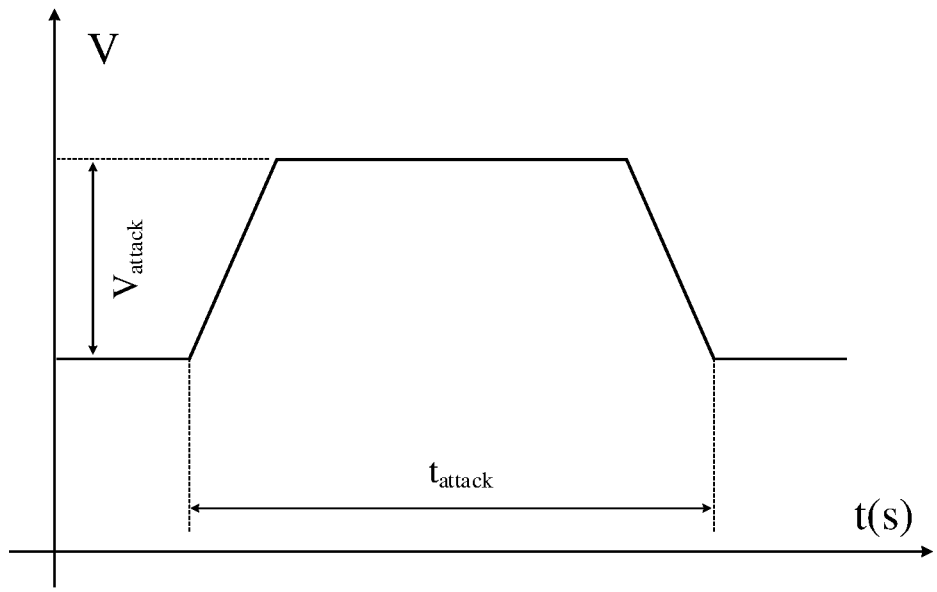
FIG. 1 is a schematic structure diagram of a voltage attack type of an embodiment of the present application.

FIG. 1 is a schematic structure diagram of a voltage attack type of an embodiment of the present application.

As shown in FIG. 1, two characteristics of voltage attacks are defined, namely attack strength $V_{attack}$ and attack duration $t_{attack}$. Accordingly, based on the characteristics of voltage attacks, voltage attacks are divided into a first type voltage attack and a second type voltage attack, where in the first type voltage attack, $V_{attack}$ is small and the $t_{attack}$ is large, and in the second type voltage attack, $V_{attack}$ is large and $t_{attack}$ is small. For example, the first type voltage attack may be a supply voltage attack, and the second type voltage attack may be a glitch attack. Both the first type voltage attack and the second type voltage attack can make the circuit inside the chip work abnormally, causing a trigger to enter an error state and causing a processor to skip or perform a wrong operation, such that the security information in the chip is exposed.

Based on the type of voltage attack, in the embodiment of the present application, a voltage sensor may be configured for protection against the first type voltage attack, and a glitch sensor may be configured for protection against the second type voltage attack.

A chip has a plurality of power domains (that is, internal supply). For example, a voltage regulation circuit (Voltage Regulator) converts an input voltage into an output voltage, and supplies power to other modules. When the chip contains a plurality such voltage regulation circuits, complex and diverse power domains are formed, and each power domain needs a voltage sensor and a glitch sensor to detect whether it is under voltage attack.

Figure 2:
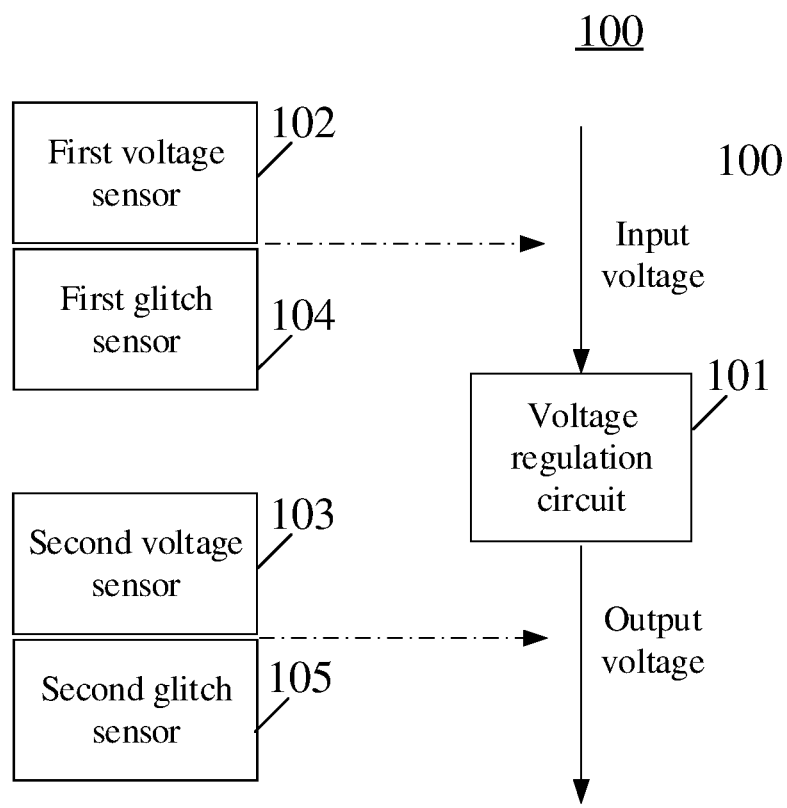
FIG. 2 is a schematic structure diagram of the positional relationship between a voltage sensor and a glitch sensor and a voltage regulation circuit according to an embodiment of the present application.

FIG. 2 is a schematic structure diagram of the positional relationship between a voltage sensor and a glitch sensor and a voltage regulation circuit according to an embodiment of the present application.

As shown in FIG. 2, the voltage attack detection circuit 100 may include a voltage regulation circuit 101, a first voltage sensor 102, a second voltage sensor 103, a first glitch sensor 104 and a second glitch sensor 105.

Here, the first voltage sensor 102 and the first glitch sensor 104 are connected to an input terminal of the voltage regulation circuit 101, and the second voltage sensor 103 and the second glitch sensor 105 are connected to an output terminal of the voltage regulation circuit 101. Accordingly, the first voltage sensor 102 and the second voltage sensor 103 are configured to detect the input voltage and output voltage of the voltage regulation circuit 101 respectively, so as to detect whether the power domain where the voltage regulation circuit 101 is located is under voltage attack of the first voltage attack type. The first glitch sensor 104 and the second glitch sensor 105 are configured to detect the input voltage and output voltage of the voltage regulation circuit 101 respectively, to detect whether the power domain where the voltage regulation circuit 101 is located is under voltage attack of the second voltage attack type.

Figure 3:
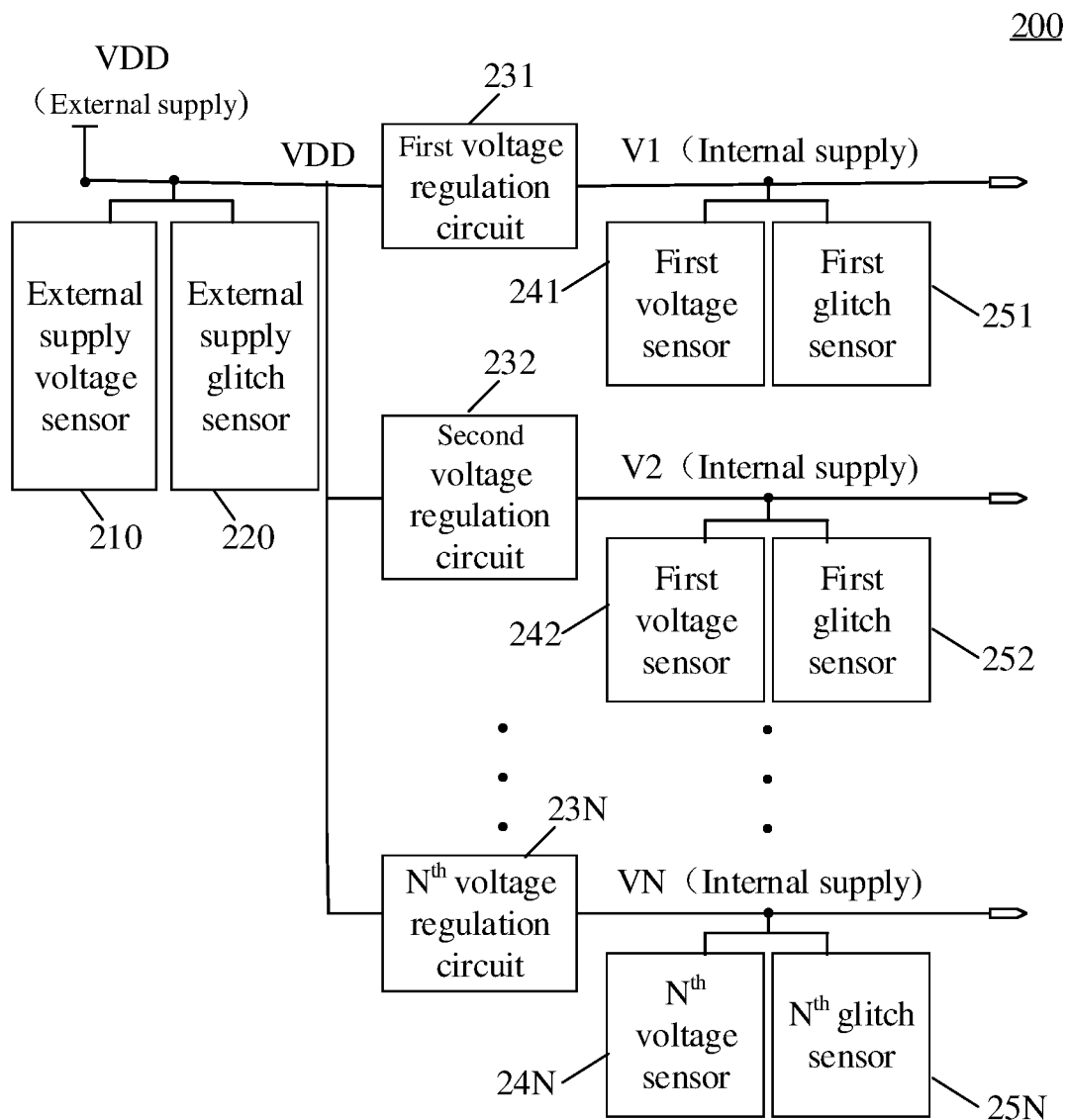
FIG. 3 is a schematic structure diagram of a voltage attack detection circuit of an embodiment of the present application.

FIG. 3 is a schematic structure diagram of a voltage attack detection circuit of an embodiment of the present application.

As shown in FIG. 3, the voltage attack detection circuit 200 may include at least one voltage regulation circuit. For example, the at least one voltage regulation circuit may include a first voltage regulation circuit 231 and a second voltage regulation circuit 232, . . . , and a $N^{th}$ voltage regulation circuit 23N, as shown in FIG. 3. The at least one voltage regulation circuit is connected to an external supply (VDD), the at least one voltage regulation circuit is configured to convert the external supply to at least one internal supply respectively. For example, the at least one internal supply may include internal supply V1, V2, . . . , and VN shown in FIG. 3, the at least one internal supply is configured to output at least one first voltage respectively for supplying power to one or some modules in the chip. Alternatively, the at least one first voltage may be partially equal, fully equal, or not equal to each other. This is not specifically limited in the embodiments of the present application.

Of course, in other alternative embodiments, the voltage attack detection circuit 200 may further include a plurality of external supplies, in this case, each external supply of the plurality external supplies may be the external supply shown in FIG. 3. In other words, the plurality of external supplies may be connected to a plurality of voltage regulation circuits respectively, and each voltage regulation circuit of the plurality of voltage regulation circuits is configured to convert the external supply connected thereto into the internal supply, the first voltage output by each voltage regulation circuit of the plurality of voltage regulation circuits may be connected to one voltage sensor and one glitch sensor, so that the first voltage sensor and the first glitch sensor perform the voltage attack detection, and accordingly, perform the attack protection in the whole power domain.

As shown in FIG. 3, the voltage attack detection circuit 200 may further include at least one voltage sensor. For example, the voltage attack detection circuit 200 may include a first voltage sensor 241 and a second voltage sensor 242, . . . , and a $N^{th}$ voltage sensor 24N as shown in FIG. 3. The voltage attack detection circuit 200 may further include at least one glitch sensor; for example, the voltage attack detection circuit 200 may further include a first glitch sensor 251, a second glitch sensor 252, . . . , and a $N^{th}$ glitch sensor 25N as shown in FIG. 3. where the at least one voltage sensor is configured to receive the at least one first voltage respectively, and configured to output at least one first signal respectively, the at least one first signal is configured to indicate whether the at least one internal supply is under voltage attack of a duration in a first range and an attack strength in a second range respectively, the at least one glitch sensor is configured to receive the at least one first voltage respectively, and configured to output at least one second signal respectively, the at least one second signal is configured to indicate whether the at least one internal supply is under voltage attack of a duration in a third range and an attack strength in a fourth range, a minimum value of the first range is greater than or equal to a maximum value of the third range, and an absolute value of a maximum value of the second range is less than or equal to an absolute value of any value of the fourth range.

Through the at least one voltage sensor, a voltage attack with an attack duration in the first range and an attack strength in the second range can be detected, and through the at least one glitch sensor, a voltage attack with an attack duration in the third range and an attack strength in the fourth range can be detected, which can perform voltage attack protection in all aspects in terms of the attack duration and the attack strength, so as to improve the reliability of the voltage attack protection solution.

In other words, by clarifying the characteristics of voltage attacks (that is, the attack duration and the attack strength) to distinguish the types of voltage attacks, and then adopt different protective measures (that is, the voltage sensor and the glitch sensor) for voltage attack protection for different types of voltage attacks, so as to cover attack measures in all aspects with respect to each power domain (that is, the output of each voltage regulation circuit), so as to construct a comprehensive and reliable anti-attack solution for the whole power domain (that is, the at least one voltage regulation circuit).

The following describes the protection range of the voltage sensor and the glitch sensor with reference to Table 1.

TABLE 1

Protection range of the voltage sensor and the glitch sensor

| $t_{attack}$ | $V_{attack}$ | |
|---|---|---|
| | −0.5*V~0.5*V | −(+) 0.5*V~−(+) V |
| 0.1 us~+ ∞ | Voltage sensor | / |
| 1 ns~0.1 us | / | Glitch sensor |

As shown in Table 1, in some embodiments of the present application, the minimum value of the first range is 0.1 microsecond (us). In other words, the first range is 0.1 us~+∞, where the $V_{attack}$ may be a direct current voltage value, and the $t_{attack}$ is configured to indicate the duration of the voltage. For example, the third range is 1 nanosecond (ns) to 0.1 microsecond (us). The second range is −0.5*V~0.5*V, where V represents a voltage value of the external supply. In other words, the fourth range is 0.5*V~V, and/or the fourth range is −V~−0.5*V.

It should be understood that those skilled in the art can adjust any one of the first range, the second range, the third range, and the fourth range based on actual conditions. For example, when a glitch sensor is configured to detect a voltage attack with a longer attack duration, it will require larger resistance and capacitance value, accordingly, a larger layout area and power consumption will be required, that is, when the glitch sensor is configured to detect a voltage attack with a shorter attack duration, it will require a smaller layout area and power consumption. Those skilled in the art can adjust the third range and the fourth range based on the actual configuration of the glitch sensor or the actual requirements of the layout area and power consumption. Similarly, those skilled in the art can also adjust the first range and the second range according to the actual configuration or actual requirements of the voltage sensor.

Similarly, the first range and the third range distinguished by 0.1 us, and the second range and the fourth range distinguished by ±0.5*V shown in Table 1 are merely examples. This is not specifically limited in the embodiments of the present application.

For example, the absolute value of the maximum value of the second range and/or an absolute value of a minimum value of the fourth range is proportional to an absolute value of a voltage of the external supply. For example, the absolute value of the maximum value of the second range and/or the absolute value of the minimum value of the fourth range may be a product of the absolute value of the voltage of the external supply and a preset percentage. For example, the second range and the fourth range may be distinguished by 20% of the voltage of the external supply, that is, the second range is −0.2*V~0.2*V. The fourth range is 0.2*V~V, and/or the fourth range is −V~−0.2*V.

In some embodiments of the present application, the at least one voltage sensor is connected to the at least one internal supply respectively, to receive the at least one first voltage respectively, and the at least one voltage sensor is configured to output the at least one first signal based on a received reference voltage and the at least one first voltage.

For example, each voltage sensor of the at least one voltage sensor may be configured to output a first signal component according to a received first voltage and a received first reference signal, the first signal component is configured to indicate whether the first voltage is greater than or equal to the first reference voltage, each voltage sensor of the at least one voltage sensor may further configured to output a second signal component according to the received first voltage and a received second reference voltage, and the second signal component may be configured to indicate whether the first voltage is less than or equal to the second reference voltage, where the first reference voltage is greater than the second reference voltage.

It should be understood that the glitch sensor in embodiments of the present application may be any sensor that can be configured to detect the second type voltage attack. For example, the glitch sensor may include a sensor of a latch.

As shown in FIG. 3, in some embodiments of the present application, the voltage attack detection circuit further includes:

an external supply voltage sensor 210 and an external supply glitch sensor 220;

where, the external supply is configured to output a second voltage, the external supply voltage sensor 210 is connected to the external supply, the external supply voltage sensor 210 is configured to receive the second voltage and output a third signal, the third signal is configured to indicate whether the second voltage is under voltage attack of a duration in the first range and an attack strength in the second range; the external supply glitch sensor 220 is connected to the external supply, the external supply glitch sensor 220 is configured to receive the second voltage and output a fourth voltage, and the fourth signal is configured to indicate whether the second voltage is under voltage attack of a duration in the third range and an attack strength in the fourth range.

In other words, a voltage sensor and a glitch sensor can be configured dedicatedly for the external supply.

In some embodiments of the present application, each voltage regulation circuit of the at least one voltage regulation circuit includes at least one of following elements:

a low dropout regulator (LDO), a charge pump, a BUCK converter (BUCK), a Boost converter (Boost), and a bidirectional Direct current-Direct current converter (DC-DC converter), which can provide a voltage of stable output voltage.

In some embodiments of the present application, each voltage sensor of the at least one voltage sensor includes a hysteresis comparator.

It should be understood that FIGS. 1 to 3 are merely examples of the present application and may not be understood as limiting the present application.

For example, in other embodiments, the voltage attack detection circuit 200 may further include a reference voltage generation circuit, the reference voltage generation circuit is configured to generate a reference voltage, and the reference voltage generation circuit is connected to the at least one voltage sensor and the at least one glitch sensor respectively, so that each voltage senor of the at least one voltage sensor outputs a first signal based on the received reference voltage and the received first voltage, and each glitch sensor of the at least one glitch sensor outputs a second signal based on the received reference voltage and the received first voltage.

For another example, in other embodiments, the voltage attack detection circuit 200 may further include a reference voltage detection circuit, connected to the reference voltage generation circuit, for detecting whether the reference voltage is abnormal, and then generating an indication signal and outputting it to the at least one voltage sensor and the at least one glitch sensor. For example, when the indication signal indicates that the reference voltage is abnormal, even if the at least one first signal is configured to indicate that the at least one internal supply is under attack of a duration in the first range and an attack strength in the second range, it is reset it to indicate that the at least one internal supply is not under voltage attack.

For another example, in other embodiments, the voltage attack circuit 200 may further include a glitch signal detection circuit, connected to the reference voltage generation circuit, to eliminate glitches on the reference voltage, thereby improving the accuracy of the indication signal.

The present application is further provided with a chip, including a power management unit and the voltage attack detection circuit described above; where the power management unit is connected to the voltage attack detection circuit, and the voltage attack detection circuit is configured to detect whether a supply voltage of the power management unit is under voltage attack.

In other words, the voltage attack detection circuit can be applied to any chip with a power management unit. For example, a security chip. For example, the security chip may be a fingerprint sensor chip or a processor chip, etc. The security chip is applicable for any kind of electronic device. For example, portable or mobile computing devices such as smart-phones, laptops, tablets and game devices, and other electronic devices such as electronic databases, automobiles and bank automated teller machines (ATM).

Those of ordinary skill in the art may be aware that, units and algorithm steps of the examples described in the embodiments disclosed herein may be implemented by an electronic hardware, or a combination of computer software and computer software. Whether the functions are executed by hardware or software depends on particular applications and design constraints of the technical solutions. Those skilled may implement the described functions by using different methods for each specific application, but the present implementation should not be considered to be beyond the scope of the present application.

Those skilled in the art to which the present disclosure pertains may clearly understand that, for convenience and simplicity of description, the specific working processes of the system, the apparatus and the units described above may refer to corresponding processes in the foregoing method embodiments, and will not be repeated redundantly herein.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. From another point of view, the displayed or discussed mutual coupling or direct coupling or communication connection may be indirect coupling or communication connection via some interfaces, devices or units, and may be in electrical, mechanical or other forms.

The units described as separate parts may be or may not be separated physically, and a component displayed as a unit may be or may not be a physical unit, namely, may be located in one place, or may be distributed on a plurality of network units. Part of or all of the units here may be selected according to a practical need to achieve the objectives of the solutions of the embodiments of the present application.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solution of the present application substantially, or the part of the present application making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present application, but are not intended to limit the protection scope of the present application. Any variation or replacement readily figured out by a person skilled in the art within the technical scope disclosed in the present application shall fall within the protection scope of the present application. Therefore, the protection scope of the present application shall be subject to the protection scope of the claims.

The invention claimed is:

1. A voltage attack detection circuit, comprising:
   at least one voltage regulation circuit, wherein the at least one voltage regulation circuit is connected to an external supply, the at least one voltage regulation circuit is configured to convert the external supply to at least one internal supply respectively, and the at least one internal supply is configured to output at least one first voltage respectively;
   at least one voltage sensor and at least one glitch sensor, wherein each voltage sensor in the at least one voltage sensor is connect to one of the at least one voltage regulation circuit and configured to receive one of the at least one first voltage respectively, and configured to output at least one first signal respectively, the at least one first signal is configured to indicate whether the at least one internal supply is under voltage attack of a first duration within a first range and a first attack strength within a second range respectively, each glitch sensor in the at least one glitch sensor is connect to one of the at least one voltage regulation circuit and configured to receive one of the at least one first voltage respectively, and configured to output at least one second signal respectively, the at least one second signal is configured to indicate whether the at least one internal supply is under voltage attack of a second duration within a third range and a second attack strength within a fourth range respectively, a minimum value of the first range is greater than or equal to a maximum value of the third range, and an absolute value of a maximum value of the second range is less than or equal to an absolute value of any value of the fourth range.

2. The voltage attack detection circuit according to claim 1, wherein the minimum value of the first range is 0.1 us.

3. The voltage attack detection circuit according to claim 1, wherein the third range is 1 ns to 0.1 us.

4. The voltage attack detection circuit according to claim 1, wherein the absolute value of the maximum value of the second range and/or an absolute value of a minimum value of the fourth range is proportional to an absolute value of a voltage of the external supply.

5. The voltage attack detection circuit according to claim 4, wherein the second range is $-0.5*V \sim 0.5*V$, wherein V represents a voltage value of the external supply.

6. The voltage attack detection circuit according to claim 4, wherein the fourth range is $0.5*V$ to V, and/or the fourth range is $-V \sim -0.5*V$.

7. The voltage attack detection circuit according to claim 1, wherein the at least one voltage sensor is connected to the at least one internal supply respectively, to receive the at least one first voltage respectively, and the at least one voltage sensor is configured to output the at least one first signal based on a received voltage reference and the at least one first voltage.

8. The voltage attack detection circuit according to claim 1, wherein the voltage attack detection circuit further comprises:
   an external supply voltage sensor and an external supply glitch sensor;
   wherein the external supply is configured to output a second voltage, the external supply voltage sensor is connected to the external supply, the external supply voltage sensor is configured to receive the second voltage and output a third signal, the third signal is configured to indicate whether the second voltage is under voltage attack of a duration within the first range and an attack strength within the second range; the external supply glitch sensor is connected to the external supply, the external supply glitch sensor is configured to receive the second voltage and output a fourth signal, and the fourth signal is configured to indicate whether the second voltage is under voltage attack of a duration within the third range and an attack strength within the fourth range.

9. The voltage attack detection circuit according to claim 1, wherein each voltage regulation circuit of the at least one voltage regulation circuit comprises at least one of following elements: a low dropout regulator, a charge pump, a BUCK converter, a Boost converter and a bidirectional Direct current-Direct current converter.

10. The voltage attack detection circuit according to claim 1, wherein each voltage sensor of the at least one voltage sensor comprises a hysteresis comparator.

11. A chip comprising:
    a power management unit; and
    a voltage attack detection circuit, comprising:
    at least one voltage regulation circuit, wherein the at least one voltage regulation circuit is connected to an external supply, the at least one voltage regulation circuit is configured to convert the external supply to at least one internal supply respectively, and the at least one internal supply is configured to output at least one first voltage respectively;
    at least one voltage sensor and at least one glitch sensor, wherein each voltage sensor in the at least one voltage sensor is connect to one of the at least one voltage regulation circuit and configured to receive one of the at least one first voltage respectively, and configured to output at least one first signal respectively, the at least one first signal is configured to indicate whether the at least one internal supply is under voltage attack of a first duration within a first range and a first attack strength within a second range respectively, each glitch sensor in the at least one glitch sensor is connect to one of the at least one voltage regulation circuit and configured to receive one of the at least one first voltage respectively, and configured to output at least one second signal respectively, the at least one second signal is configured to indicate whether the at least one internal supply is under voltage attack of a second duration within a third range and a second attack strength within a fourth range respectively, a minimum value of the first range is greater than or equal to a maximum value of the third range, and an absolute value of a maximum value of the second range is less than or equal to an absolute value of any value of the fourth range;

wherein the power management unit is connected to the voltage attack detection circuit, and the voltage attack detection circuit is configured to detect whether a supply voltage of the power management unit is under voltage attack.

12. The chip according to claim 11, wherein the minimum value of the first range is 0.1 us.

13. The chip according to claim 12, wherein the third range is 1 ns to 0.1 us.

14. The chip according to claim 13, wherein the absolute value of the maximum value of the second range and/or an absolute value of a minimum value of the fourth range is proportional to an absolute value of a voltage of the external supply.

15. The chip according to claim 14, wherein the second range is −0.5*V~0.5*V, wherein V represents a voltage value of the external supply.

16. The chip according to claim 14, wherein the fourth range is 0.5*V to V, and/or the fourth range is −V~−0.5*V.

17. The chip according to claim 11, wherein the at least one voltage sensor is connected to the at least one internal supply respectively, to receive the at least one first voltage respectively, and the at least one voltage sensor is configured to output the at least one first signal based on a received voltage reference and the at least one first voltage.

18. The chip according to claim 17, wherein the voltage attack detection circuit further comprises:
an external supply voltage sensor and an external supply glitch sensor;
wherein the external supply is configured to output a second voltage, the external supply voltage sensor is connected to the external supply, the external supply voltage sensor is configured to receive the second voltage and output a third signal, the third signal is configured to indicate whether the second voltage is under voltage attack of a duration within the first range and an attack strength within the second range; the external supply glitch sensor is connected to the external supply, the external supply glitch sensor is configured to receive the second voltage and output a fourth signal, and the fourth signal is configured to indicate whether the second voltage is under voltage attack of a duration within the third range and an attack strength within the fourth range.

19. The chip according to claim 11, wherein each voltage regulation circuit of the at least one voltage regulation circuit comprises at least one of following elements: a low dropout regulator, a charge pump, a BUCK converter, a Boost converter and a bidirectional Direct current-Direct current converter.

20. The chip according to claim 11, wherein each voltage sensor of the at least one voltage sensor comprises a hysteresis comparator.

* * * * *